United States Patent [19]
Finkel et al.

[11] 3,742,186
[45] June 26, 1973

[54] IMPROVEMENT IN A GRAPPLING DEVICE

[75] Inventors: Abraham M. Finkel, North Hollywood; Charles R. Jensen, Santa Susana, both of Calif.

[73] Assignee: Lockheed Aircraft Corporation, Burbank, Calif.

[22] Filed: July 19, 1971

[21] Appl. No.: 163,650

[52] U.S. Cl................. 219/160, 219/60 A, 228/44, 269/48.1
[51] Int. Cl............................................. B21j 13/08
[58] Field of Search................ 219/160, 60 A, 60 R, 219/125; 269/48.1; 228/44, 50

[56] References Cited
UNITED STATES PATENTS

| | | | |
|---|---|---|---|
| 2,167,886 | 8/1939 | Graham et al.................. | 269/48.1 X |
| 2,821,946 | 2/1958 | Goekler............................ | 269/48.1 |
| 3,031,995 | 5/1962 | Taylor, Jr. ......................... | 269/48.1 |
| 3,261,529 | 7/1966 | Pagan ............................. | 219/160 X |
| 2,226,078 | 12/1940 | Spahn............................. | 269/48.1 X |

FOREIGN PATENTS OR APPLICATIONS

| | | | |
|---|---|---|---|
| 24,276 | 12/1956 | Germany.......................... | 269/48.1 |

Primary Examiner—C. L. Albritton
Assistant Examiner—L. A. Schutzman
Attorney—Frank L. Zugelter and George C. Sullivan

[57] ABSTRACT

A grappling device for achieving a seizure of two abutting tubes for welding purposes. The device comprises a pair of sets of wedge-shaped segments radially slidable on a center guide plate, and a corresponding pair of frustum members which move axially of the guide plate so as to radially extend or retract the segments. Means for axially moving the frustum members extend centrally of the plate and such members, and a cable means is attached thereto for flexible manipulation of the device from any point remote from the welding joint area irrespective of whether the configuration of abutting tubes is straight, bent, or curved. Actuation of the sets of wedge-shaped or mandrel segments provides a seizure upon and, thus clamping for the abutting tubes. Provision is made in the segment structures for chill bars which also provide for complete circulation of purging gas at the joint.

10 Claims, 4 Drawing Figures

PATENTED JUN 26 1973        3,742,186

ABRAHAM M. FINKEL
CHARLES R. JENSEN
*INVENTORS.*

ABRAHAM M. FINKEL
CHARLES R. JENSEN
INVENTORS.

BY George C. Sullivan
Agent

Frank L. Zugelter
Attorney

IMPROVEMENT IN A GRAPPLING DEVICE

BACKGROUND OF THE INVENTION

1. Field of the Invention

The field of art to which the invention is most likely to pertain is located in a class of devices generally relating to devices supporting tubes together for welding purposes. Classes 219, Electric Heating; 228, Metal Fusion-Bonding Apparatus; 269, Work Holders; and 279, Chucks or sockets U. S. Patent Office Classifications, may be the applicable general areas of art in which the claimed subject matter of the type involved here may be classified.

2. Description of the Prior Art

Examples of prior art devices in the arts to which this invention most likely pertains are U. S. Pat. No. 402,107; 1,696,455; 1,964,926; 2,830,821; 2,367,703; and U.S.S.R. Letters Patent No. 204,465 (citation date: 25 XII 1967).

PROBLEMS PREVIOUSLY ASSOCIATED WITH WELDING TUBES

A problem of providing complete abutment during a welding cycle of all loci of points on the ends of the walls of two abutting tubes so as to result in a complete and uniformly welded joint bead existed prior to this invention. This problem was particularly true where very thin thicknesses of the walls was the case. Furthermore, excessive oxygen embrittlement occurred during the welding cycle for tubes made of titanium, causing failure thereof. Use of prior devices did not eliminate entry of oxygen to the welding area. Also, difficulty in achieving a complete, uniform weld of tubing ends or the like having different wall thicknesses and/or dimensions has been experienced. Devices utilized in the past, too, have not provided efficient structure which assists the chilling of fallen metal while nevertheless providing for the circulation of purging gas, such as argon, along the line and in the area of welding. Prior art devices have in many instances, by reason of their structures, prevented complete welding penetration in an atmosphere of gas to form a solid weld bead, thus, resulting in a weakened weld bead at the joint. Lastly, prior art devices have been limited in their application to straight-lined tubing, and have not been structurally developed to provide satisfactory clamping of the abutting ends of two tubes or the like whose configurations include a variety of or an innumerable number of turns, curves and angles, one tube to the next, and which must be assembled together for specific applications. An example of such an application is aircraft ducting. Such ducting, for many reasons, is not installed as simple and straight-lined piping.

SUMMARY OF THE INVENTION

This invention relates to grappling devices, and in particular, to a welding mandrel device for the purpose of seizing upon and clamping together in abutting relationship the adjacent ends of two tubes prepared for welding, with the mandrel in place at the joint formed by the two tubes during the welding operation.

An object of this invention is to provide an improvement in a grappling device for welding purposes or otherwise securing together the joined ends of tubes or the like formed from either metal or plastic.

Another object of this invention is to provide a complete welding penetration at the joined ends and being assisted by structure providing satisfactory chilling of the metal as a result of use of a device embodying this invention.

A further object of this invention is to provide an efficient and satisfactory joint between two tubes or the like having different wall thicknesses and/or dimensions by utilization of the device embodying this invention.

A still further object of this invention is to provide a grappling device capable of clamping tubes or the like other than those which are round or completely circular, such as, for example, oval, elliptical, parabolic, square, triangular, rectangular, or polygonal in cross-section.

Another object of this invention is development of an enclosed chamber formed at the joint being welded and in which chamber purging gas, such as argon, is freely and fully circulated, and which will prevent occurrence of oxidation which is notoriously known for weakening a weld joint should it be present during titanium welding.

A further object of this invention is to provide for efficient clamping and abutting of two tubes together by the device embodying this invention, regardless of the complexity of turns, curves, and angles in the body of the one or both tubes, or tubes in tandem, being welded at their joined ends, or regardless of whether one or both tubes being welded include a tapering wall configuration.

Another object of this invention is to provide for actuation of the device embodying the invention at any point, proximate or remote from the joined ends of the tubes, thus facilitating the assembling together and the seizing clamping and abutting of joined tubes of any degree of complexity of body configuration or design.

These and other objects and advantages of this invention will become apparent on a full reading of the following description, the appended claims thereto, and the accompanying drawing.

DESCRIPTION OF THE PREFERRED EMBODIMENT

Figure 1:
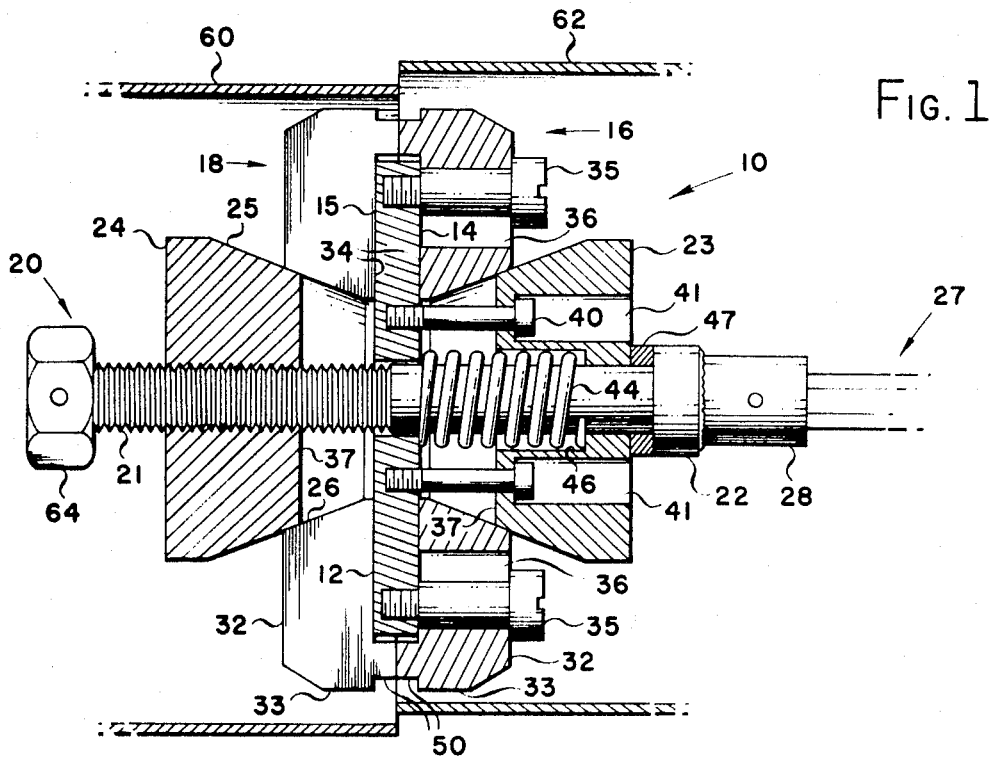
FIG. 1 is an elevational view, partly in section, of a device embodying the invention and which is in a collapsed condition.

Referring now to the drawing in which reference characters correspond to like numerals hereinafter, reference character 10 refers generally to a grappling device embodying the invention. Device 10 comprises a flat metal circular plate means 12 having opposing faces 14, 15 and on which faces 14, 15 sets 16, 18 of mandrel segment means are respectively disposed and mounted. A means 20, such as a bolt including a threaded shaft or shank 21 and head 22, extends centrally through plate means 12 and by its operation actuates each of a pair of aligned and inverted frustum members 23, 24, each being mounted to a face 14, 15, respectively. Members 23, 24 are in symmetrical relationship to the bolt shank 21 extending through them, and to plate means 12, such that their coned surfaces 25 are capable of physically engaging each of complementary surfaces 26 included in each mandrel segment means on each set 16, 18. A driving means 27, say, for example, a flexible cable or shaft member and suitable handle (not shown) thereto and of a desired length, is secured to the actuating means 20 for the purpose of driving or rotating means 20 at a point remote from the point or line of joining together the ends of tubes, pipes or the like. In the embodiment shown, a socket-and-pin-arrangement 28 welded to head 22 connects means 27 to means 20. The desired length is generally dictated by the length of a second tube placed into abutting relationship with a first tube, as will become evident from the description of the operation of device 10 hereinafter. It should be understood also that device 10 is directly operable at a position immediately next to means 20, such as at bolt head 22, should welding or other circumstances make it more convenient to do so.

Each set 16, 18 of mandrel segment means comprises a plurality of flat wedge-shaped, preferably copper, elements 32 (FIG. 3) each thereof having an annular wall 33 disposed exteriorly of the circumferential limits of plate means 12 and which is adapted to seize, clamp or otherwise frictionally engage the inner wall of the tube or the like. Each mandrel element 32 has a base 34 slidably engageable with a complementing face 14, 15 of plate means 12. Means, such as a threaded bolt 35 extending through a slot 36 included in each mandrel element 32, is secured to plate means 12 for guiding in a radial direction the sliding movement of each element 32 on plate means 12 while also connecting such element 32 to the base plate 12 in a retained relationship. Each slot 36 is centered on a radius of guide plate 12, whereby its element 32 is capable of sliding radially on guide plate 12 in either direction to the limits thereof. The length along and disposition of a slot 36 in an element 32 determines the extent of maximum movement of each set 16, 18 of the mandrel segment means, although during actual use of a given sized device 10, such maximum movement need not be experienced. Radial retraction or extension of each set 16, 18 of the mandrel segment means on the center guide plate 12 constitutes a collapsed or expanded condition for device 10, as the case may be, in terms of either inward or outward radial movement.

Each frustum member 23, 24 is disposed over its respective face 14, 15 of plate means 12 in such a manner that their respective smaller ends 37 face each other in generally parallel fashion. These members 23, 24 are preferably formed of a suitable solid metal material. Stainless steel, for welding purposes, is preferable. Both members 23, 24 are prevented from rotating relative to each other and to plate means 12 by means of a pair of dowel pins 38 (FIG. 3) slip fitted through suitable apertures respectively provided in both members 23, 24 and securely connected to the plate means 12, such as by a press fit in corresponding apertures provided in plate means 12. With such slip fits and press fit, dowel pins 38, nevertheless, provide axial translation of members 23, 24 relative to guide plate means 12.

Although each of the frustum members 23, 24 function in the same manner as the other; viz., to extend and retract their respective sets 16, 18 of mandrel segment means, each operates in a manner different from the other in relation to other components of device 10, as described immediately hereinafter.

Figure 2:
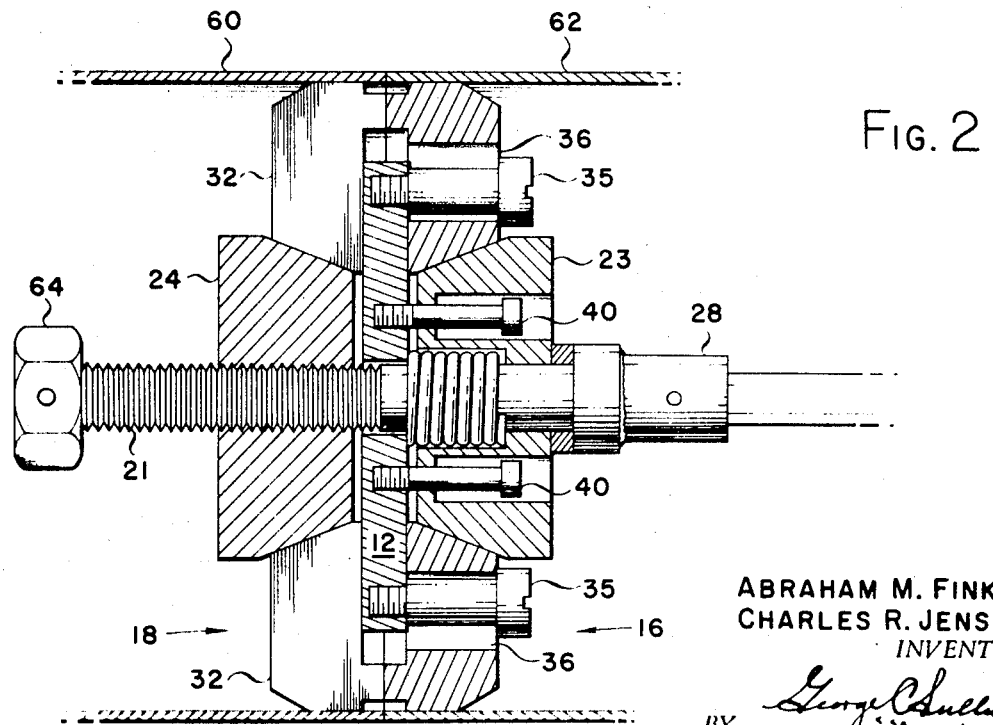
FIG. 2 is an elevational view, partly in section, of a device embodying the invention and which is in an expanded condition.

Frustum member 23 is capable of freely sliding along bolt shank 21. However, it is limited in this axial movement, on the one hand, by set screws 40 recessed in suitable bores 41 provided in itself and which are also threadedly secured to plate means 12 (FIG. 1), and on the other hand, by maximum engagement of its coned surface 25 with its complementing surfaces 26 of mandrel elements 32 in set 16 (FIG. 2).

A coiled compression spring 44 is seated in an axial recess 46 provided in member 23 and about bolt shank 21, and reacts against plate means 12 to bias member 23 against bolt head 22, or preferably a washer 47 mounted thereto. In this manner, frustum member 23 is axially movable toward or away from plate 12 in the assembled device 10 by reason of the means 20 being further threaded or unthreaded (advanced or withdrawn) upon frustum member 24.

Member 24 is threaded to bolt shank 21 and is capable of axial translation relative thereto and to guide plate means 12. By rotation, then, of means 20 in one direction, cone surface 25 on member 24 engages its complementing surfaces 26 on mandrel elements 32 of set 18 to extend such elements 32 radially outwardly of guide plate means 12 and to a maximum extent (FIG. 2). Converse rotation of means 20, of course, releases surfaces 26 from such elements 32, thereby set 18 being capable of retracting from its expanded condition (FIG. 1).

The operation and effect, then, of the axial translation of members 23, 24 by means 20 should now be readily apparent. The frustum members 23, 24 axially translate away from each other by withdrawing means 20. The distance frustum member 23 travels along the length of shank 21 is generally the same distance for frustum member 24, by reason of spring 44 urging member 23 away from plate means 12. Each set 16, 18 of mandrel segments may be caused to be radially retracted, such as by freely sliding, upon plate means 12 within the limits of slots 36. Conversely, frustum members 23, 24 axially translate or move toward each other as means 20 advances. Member 23 translates against the action of spring 44 generally the same distance as member 24 translates on bolt shank 21. Each set 16, 18 of mandrel segments radially extends away from the center of guide plate means 12 and within the limits of slots 36.

The length of travel of frustum member 23 is modified in the event two tubes of either different diameters and/or different wall thicknesses are joined together. This will become evident from a reading of the description below in regard to FIG. 4.

Figure 3:
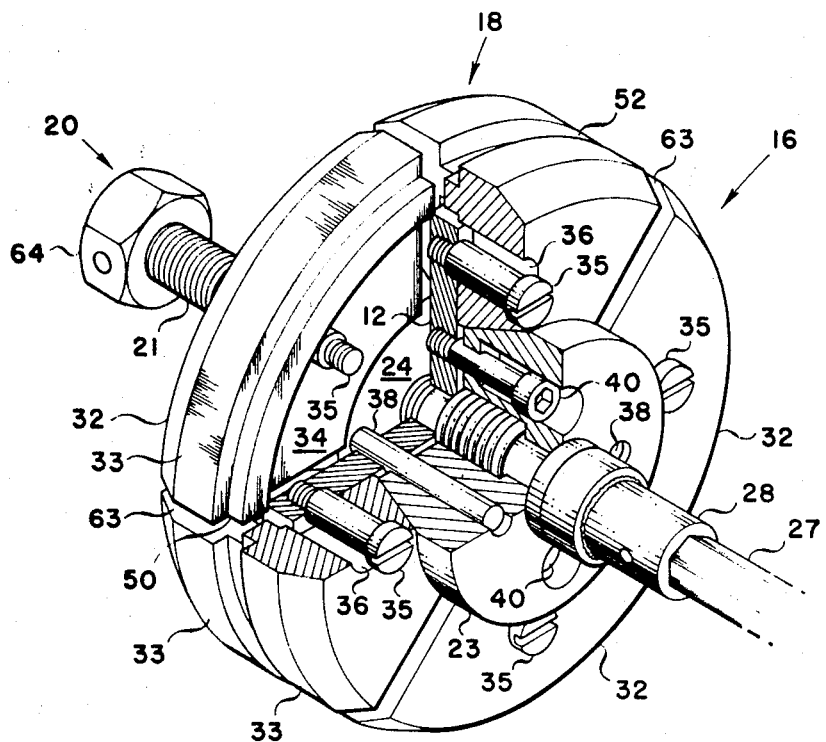
FIG. 3 is a perspective view, partly cut away, of the device shown in FIGS. 1 and 2.

An annular projection 50 (FIGS. 1 and 3) is mounted on the base 34 of each mandrel element 32, extending in an axial direction for device 10, and is of an arcuate length co-extensive and generally in parallel alignment with the loci of points forming its associated annular wall 33. It is integrally formed in the peripheral portion of the element 32 and is disposed exteriorly of the circumferential limits of plate means 12 and located at a finite distance from its associated annular wall 33, as shown in FIG. 3. Each projection 50 on an element 32 in one set 16, 18 mates with one or more like projections 50 on one or more elements 32 in the other set 16, 18 in the assembly and actual use of device 10 on tubes having equal inner diameters. These mated projections 50 constitute chilling bar means for chilling fallen metal generated in the welding cycle, while at the same time, establish an endless annular groove 52, such groove lying between the planes in which the faces 15, 14 of plate means 12 lie. As the annular walls 33 of all the elements 32 of both sets 16, 18 clamp the inner walls at the ends of two abutting tubes 60, 62, endless annular groove 52 forms with such walls an annular chamber for circulation of a purging gas, such as argon, to all loci of points internally forming the joint of the two abutting tubes.

In applying device 10 in its collapsed condition to a pair of tubes 60, 62 having equal diameters, the set 18 of mandrel segments is introduced into the end of the tube 60 which is securely mounted, say, in a suitable jig or frame (not shown). Flexible cable means 27 is rotated so that elements 32 in set 18 frictionally engage the inner wall of tube 60 adjacent its end. An end of the second tube 62 is then brought into adjacent proximity with such end of tube 60 by passing tube 62 over cable means 27 and device 10 in a circumscribing manner. Set 18 is slightly loosened from its frictional engagement with tube 60 so that the end of tube 62 may be passed over elements 32 of set 16 and brought into abutting relationship with tube 60. Cable means 27 may then again be rotated to radially expand together both sets 16, 18 of the mandrel segments. Device 10 seizes or clamps upon the inner walls of both tubes 60, 62 at their joined ends. The entire unit is then put into a welding atmosphere, in which purging gas is introduced and circulated about the chamber formed by annular groove 52 and the walls of the tubes. A radially directed spacing 63 between each pair of adjacent elements 32 in each set 16, 18 of mandrel segments is established in the geometrical design, assembly, and expansion of device 10, in order for such gas to pass into the endless annular groove 52 and the indicated formed chamber.

Release of device 10 from its clamped condition is readily apparent. It is accomplished by rotating shank member or cable means 27 in a reversed fashion so as to provide a manual collapsing or drawing together of both sets 16, 18 of the mandrel segments.

In assembling device 10, dowel pins 38 are press fit to plate means 12. Frustum member 23 and spring 44 in recess 46 are mounted to plate means 12 by means of set screws 40, member 23 being slip fitted to the dowel pins 38. Bolt shank 21 is then passed through member 23 and plate means 12. Frustum member 24 is then located onto dowel pins 38, after which bolt shank 21 is threaded or advanced into and through member 24. Each mandrel element 32 for each set 16, 18 is then assembled to plate means 12 by means of a bolt 35 in its corresponding slot 36, while frustum members 23, 24 are in this relaxed position. After such elements 32 have been properly connected to plate means 12, axial adjustment of frustum members 23, 24 may be accomplished. Means 20 may be sufficiently rotated to the point at which frustum member 23 is first biased away from plate means 12, by spring 40 urging it against the bolt head 22, at its maximum position from plate means 12. This position is easily maintained while the bolt shank 21 is continued to be turned until frustum member 24 is spaced the same general distance from plate means 12 as is frustum member 23. Thereafter, cable means 27 and a nut 64 may be suitably secured to their respective ends of means 20.

The preferred embodiment, as shown in FIG. 3, provides for a staggered arrangement between the opposing elements 32 of the sets 16, 18 of mandrel segments, although the operation of device 10 is not necessarily limited to such a staggering of the sets 16, 18. Should alignment of the sets 16, 18 be desired, such that spaces 63 of set 16 align with spaces 63 of set 18, it is merely a matter of changing the positions of slots 36 and bolts 35 on plate means 12 so as to provide for alignment of corresponding elements 32 of the sets 16, 18. I.e., axially align one element 32 in set 16 with an element 32 in set 18, and then design slots 36 in plate means 12 accordingly therefor.

Figure 4:
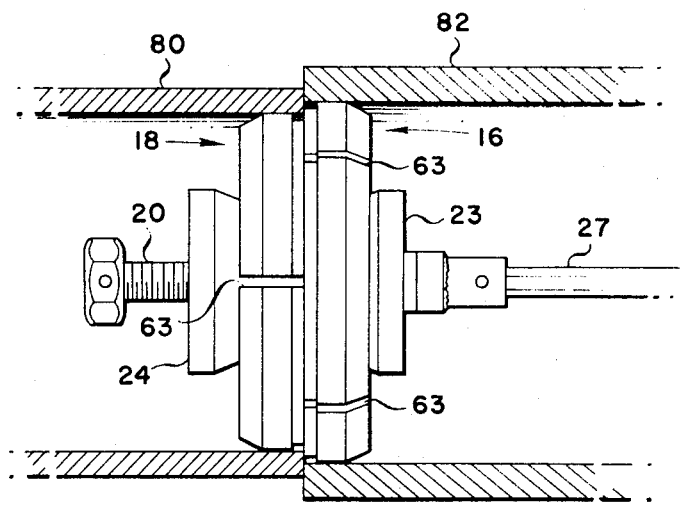
FIG. 4 is an illustration showing the efficacy of a device embodying the invention and as applied to two abutting tubes each having a wall thickness and/or a dimension different than the other.

The construction of device 10 is not limited in its use to seizing or clamping upon the abutting ends of tubes having the same inner diameter and wall thicknesses dimensions and as shown in FIGS. 1 and 2. FIG. 4 illustrates the variation in operation of device 10, in that the set 16 of mandrel segments may clamp a tube having a greater diameter than that clamped by set 18. This is accomplished by the "give" characteristic provided for set 16 in spring 44. As means 20 is rotated, set 18 reaches its clamped position against a tube 80. As an abutting tube 82 has a greater diameter than that of tube 80, set 16 is not yet in clamped position thereon. Further rotation of means 20, although set 18 no longer expands, continues to expand set 16 until it clamps its tube 82. Provision in design of device 10 of a suitable compression spring 44, length of recess 46, and maximum axial translation for frustum member 23 assures that maximum translation of frustum cone 23, and consequently, maximum should now be evident that the FIG. 4 expansion of set 16, does not occur at the maximum expansion of set 18 in tube 80. Rather, that maximum expansion of set 16 occurs, not only at a diameter greater than the inner diameter of tube 80, but it occurs within the maximum axial translation provided for frustum member 23.

It should now be evident that the FIG. 4 illustration of the invention provides the capability of additional axial translation of one of the frustum-shaped members to radially extend or expand its associated set of wedge-shaped elements farther than the other set of such elements. In particular, the inclusion of the recess 46 and the spring 44 with the one frustum member 23, together with the head 22 which constitutes a means on the shaft 21 for cooperative action with member 23 so as to control the bias action of the spring 44, against such member 23, provides this unique advantage.

It may be noted that although an endless annular groove, such as groove 52 in FIGS. 1 and 2, may not be established in the FIG. 4 application of device 10, nevertheless, flow of purging gas to the joined ends of tubes 80, 82 is provided by spacings 63 between the expanded mandrel elements 32 of both sets 16, 18.

Various changes and modifications may be made in device 10. Any convenient number of elements 32 may be incorporated in each set 16, 18, although it is believed that at least three in each set is required. Elements 32 need not have the same dimensions in one set of mandrel segments as in the other set. Device 10 may be designed to clamp walls of tubes of non-circular cross-section and to clamp walls having tapered formations. In regard to copper may be substituted for elements 32, if found tubes of non-circular cross-sectional configuration, it should be understood that reference to the terms "radius," "radial," "radially," or their derivatives, is not limited to a radius of a circle, but, within the spirit and scope of the invention, includes a line from a center of any tubing to any point on its wall irrespective of the cross-sectional configuration of such wall. Material other than copper may be substituted for elements 32, if found efficacious. Use of device 10 is not limited to welding metal tubes, piping or the like, but may also be used to clamp plastic tubing together preparatory to unifying them.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what we claim as patentably novel is:

1. In a device for grappling end portions of tubes or the like abutting each other, and in which axially translatable opposing inverted frustum-shaped members mounted on a shaft provide radial movement for elements engaging each of said frustum-shaped members so that said elements are adapted to seize upon such end portions, the improvement comprising a plate having opposing faces extending to its circumferential limits, a set of said elements mounted on each of said faces and extending beyond such circumferential limits, each of said elements including a wall for seizing one of such tubes or the like and a base in sliding engagement with a corresponding face on said plate, each of said elements being wedge-shaped in a radial direction and including at least one slot radially oriented relative to said plate, and means extending through each slot and secured to said plate for guiding the sliding movement on said plate of each said elements in a radial direction, whereby axial translation of said frustum-shaped members expands or collapses said elements.

2. The improvement of claim 1 wherein said guiding means includes means for retaining each of said elements to said center plate.

3. The improvement of claim 1 wherein an axially-directed projection is mounted on the base of each of said elements exteriorly of such circumferential limits of said plate, the projections on each set of elements mating with the like projections on the other set of elements to constitute chilling bar means.

4. The improvement of claim 1 including means for connecting the frustum-shaped members to said plate to prevent rotation of said members but to nevertheless provide axial translation thereof.

5. The improvement of claim 4 wherein said connecting means comprises a pair of axially-extending pins press fit to said plate and slip-fitted to said frustum-shaped members.

6. The improvement of claim 1 including means for radially expanding one set of elements farther than the other set of elements, said expanding means comprising one of such frustum-shaped members including a recess open to said plate and through which such shaft extends, a spring in said recess mounted about such shaft, means on the shaft for operative relationship to the one of such frustum-shaped members whereby the reaction by said spring against said plate in a direction away from the other of said frustum-shaped members is controlled, the other of such frustum-shaped members being threadedly mounted to said shaft, whereby rotation of said shaft in one direction expands both sets of elements while providing the capability of additional axial translation of the the one of such frustum-shaped members to radially extend its associated set of elements farther than the other set of elements.

7. The improvement of claim 6 wherein said guiding means includes means for retaining each of said elements to said center plate.

8. The improvement of claim 6 wherein an axially-directed projection is mounted on the base of each of said elements exteriorly of such circumferential limits of said plate, the projections on each set of elements mating with the like projections on the other set of elements to constitute chilling bar means.

9. The improvement of claim 6 including means for connecting the frustum-shaped members to said plate to prevent rotation of said members but to nevertheless provide axial translation thereof.

10. The improvement of claim 9 wherein said connecting means comprises a pair of axially-extending pins press fit to said plate and slip-fitted to said frustum-shaped members.

* * * * *

UNITED STATES PATENT OFFICE
CERTIFICATE OF CORRECTION

Patent No. 3,742,186                    Dated June 26, 1973

Inventor(s) Abraham M. Finkel et al

It is certified that error appears in the above-identified patent and that said Letters Patent are hereby corrected as shown below:

Figure 4 should appear as shown below.

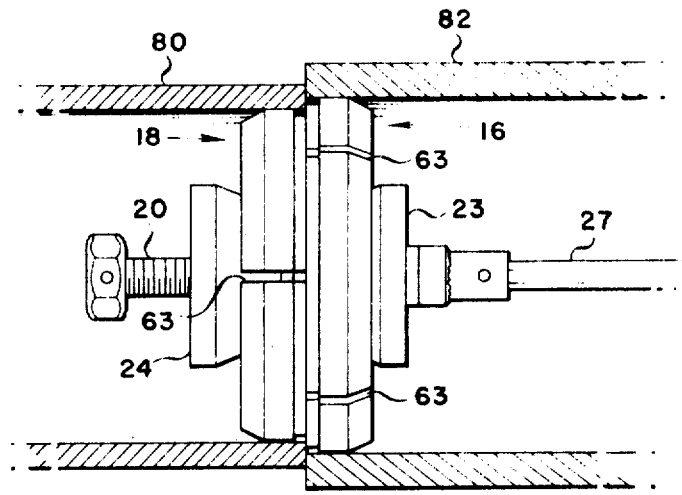

Fig. 4

Signed and sealed this 20th day of May 1975.

(SEAL)
Attest:

RUTH C. MASON
Attesting Officer

C. MARSHALL DANN
Commissioner of Patents
and Trademarks